April 28, 1931.                J. W. WILKINSON                1,803,047
                                  EGG CARRIER
                          Filed Oct. 24, 1928    2 Sheets-Sheet 1

Inventor
J. W. Wilkinson.
By Lacey & Lacey, Attorneys

April 28, 1931.  J. W. WILKINSON  1,803,047
EGG CARRIER
Filed Oct. 24, 1928   2 Sheets-Sheet 2
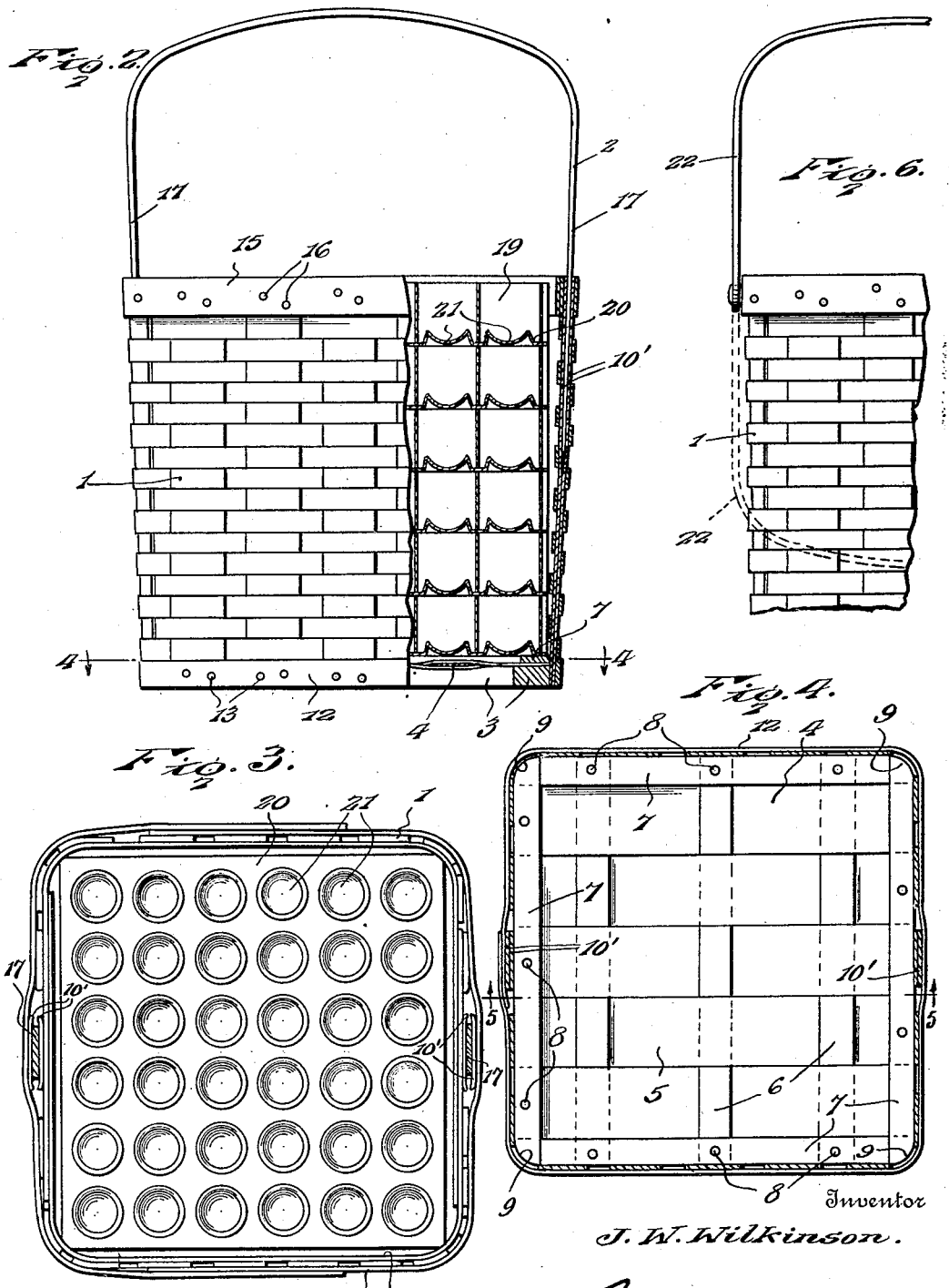

Patented Apr. 28, 1931

1,803,047

UNITED STATES PATENT OFFICE

JAMES W. WILKINSON, OF MARION, INDIANA

EGG CARRIER

Application filed October 24, 1928. Serial No. 314,775.

This invention relates to special receptacles and more particularly to a receptacle in which eggs may be placed and carried or shipped from one place to another.

One object of the invention is to provide a device of this character so constructed that, when filled with eggs, it may be very easily lifted and carried from one place to another and further so constructed that, when egg trays and spacers are arranged in the body portion of the carrier, they will be firmly held in place by contact with the corner portions of the receptacle or body of the carrier but spaced from the walls thereof and thereby allow air to circulate through the trays to prevent the eggs from spoiling and in addition prevent danger of the eggs being broken if the walls of the carrier should be accidentally struck.

Another object of the invention is to provide a carrier including a receptacle or body portion formed of interlaced strips of wood or the like which will be very strong and durable and capable of being subjected to hard or careless usage without being damaged.

Another object of the invention is to provide the device with a handle having depending arms very firmly secured to the receptacle or body portion of the carrier and not liable to work loose.

The invention is illustrated in the accompanying drawings, wherein

Fig. 2 is a view showing the egg carrier partially in side elevation and partially in vertical section, Fig. 3 is a top plan view of the carrier with the handle shown in section, Fig. 4 is a transverse sectional view taken on the line 4—4 of Fig. 2, Fig. 6 is a fragmentary view showing a folding handle instead of a rigid handle.

Figure 1:
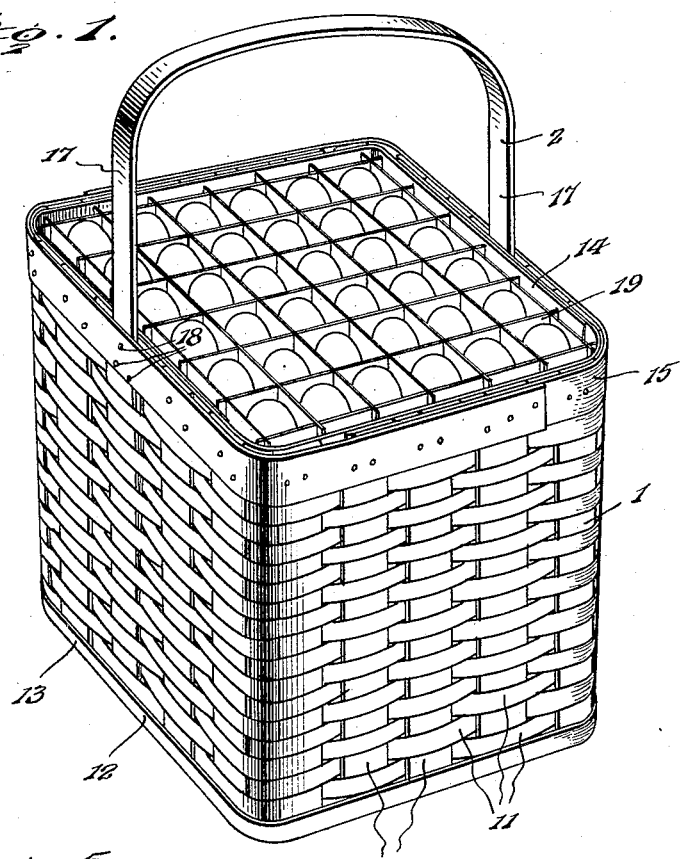
Figure 1 is a perspective view of the improved egg carrier.
Figure 5:
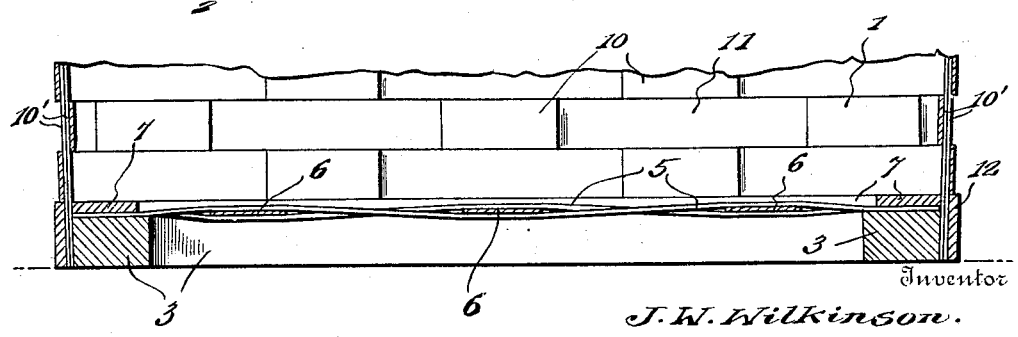
Fig. 5 is a sectional view taken on the line 5—5 of Fig. 4.

The improved egg carrier includes a receptacle or body, indicated in general by the numeral 1, and provided with a handle 2 by means of which it may be easily lifted and carried from one place to another. The bottom of the receptacle is provided with a frame formed of strips or bars 3 which are rectangular in cross section and formed of wood. These side bars are joined at their ends to form a frame which is substantially rectangular in shape and upon the frame rests a mat 4 consisting of interwoven strips 5 and 6 of thin wood. After the mat has been set in place, retainer strips 7 are applied to the margins of the mat and securing nails 8 driven through the strips 7 and margins of the mat into the side bars of the frame. By this arrangement a very strong bottom will be formed. It should be noted that, while the bottom is substantially rectangular in shape, it has its corners rounded, as shown at 9 in Fig. 4, by cutting the ends of the side bars and retainer strips.

The walls of the receptacle are of a matlike construction and consists of vertically extending strips 10 of thin wood and horizontally extending strips 11 which are narrower than the strips 10 and are interwoven therewith. The lower ends of the walls overlap the outer side edge faces of the bars 3 and firmly bound against the same by a binding strip 12 secured by nails 13. About the upper margins of the walls are provided inner and outer binding strips 14 and 15 secured by nails 16. It should be noted that opposed walls of the receptacle are provided with inner and outer vertically extending strips 10' between which extend the depending arms 17 of the handle 2. By this arrangement the arms of the handle will be firmly secured when the nails 18 are driven into place and there will be no danger of the handle working loose or moving out of its proper position in crossed relation to the receptacle. In view of the fact that the walls of the receptacle are formed of thin strips of wood which have a certain amount of resiliency and the corners of the bottom are rounded the walls as they extend upwardly will not define a true rectangle and in addition these walls flare slightly towards their upper ends, as shown in Figs. 2 and 3.

Within the receptacle are disposed egg trays 19 formed of crossed and interlaced strips of thin cardboard in the usual manner and between the egg trays are disposed spacing sheets 20 which may be formed with egg-receiving pockets 21 or the pockets may be omitted. These trays and spacing sheets are stacked in the receptacle, as shown in Fig. 2, with the sheets disposed between the trays, a sheet being first set in place so that the eggs will not rest directly upon the bottom of the receptacle. By referring to Figs. 1 and 3, it will be seen that the corners of the trays and sheets which are rectangular in shape when viewed in top plan bear against the rounded corners of the receptacle, whereas the straight cut side edges are spaced from the walls thereby leaving spaces between the walls of the receptacle and the egg trays and sheets, as shown in Figs. 2 and 3, so that air may circulate freely in order to prevent danger of the eggs spoiling when shipped some distance during warm weather. This arrangement will also eliminate danger of breaking the eggs as the walls of the receptacle, if accidentally struck while being carried or when placed in a vehicle, may be sprung inwardly to absorb the force of a blow without contacting with the trays or spacing sheets. If so desired, the receptacle may be provided with a handle of the folding type shown in Fig. 6. This handle which is indicated by the numeral 22 is pivoted to the sides of the receptacle and is of such size that it may be swung down against the receptacle where it will be out of the way.

Having thus described the invention, I claim:

1. A carrier comprising a receptacle including a body rectangular in shape and having side walls and rounded corners at the intersection of its walls, and a stack of alternately arranged spacers and trays in said body readily removable therefrom, said trays and spacers being rectangular in shape and all of substantially the same dimensions, said spacers having sharp corners in close contacting engagement with the rounded corners of the body to maintain the same in position against shaking.

2. A carrier comprising a receptacle including a bottom rectangular in shape and having rounded corners at the intersection of its sides, vertically extending strips having their lower ends secured to the bottom and horizontally extending splints interlaced with the strips and together therewith forming a body having flat side walls and rounded corner portions connecting the walls and merging into the same, and a stack of alternately arranged spacers and trays in the body readily removable therefrom, said trays and spacers being rectangular in shape and all of substantially the same dimensions, said spacers having sharp corners in close contacting engagement with the rounded corners of the body and engaging horizontal edges of the interlaced splints to prevent vertical movement of the trays and spacers in the body, the trays and spacers having their side edges spaced from the walls of the body.

In testimony whereof I affix my signature.

JAMES W. WILKINSON. [L. S.]